(No Model.)
J. R. MOORE.
JOINT FOR PIPES AND FITTINGS.
No. 255,734. Patented Mar. 28, 1882.
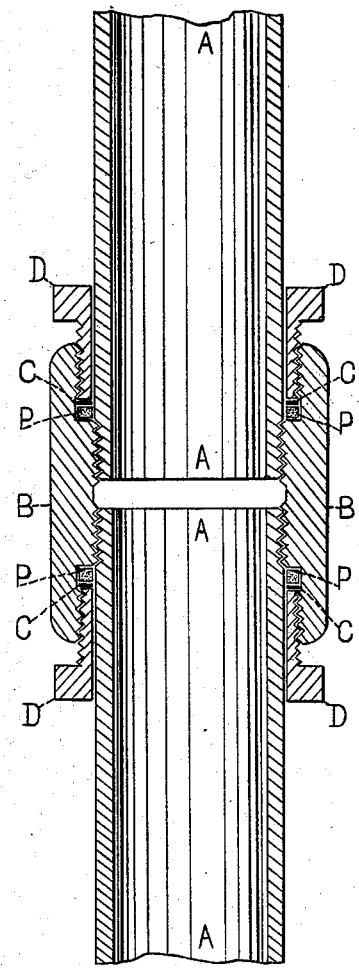
ATTEST:
John Buckler,
Chas U Wren.
John R Moore
INVENTOR:
by his attorney
W C Wren

UNITED STATES PATENT OFFICE.

JOHN R. MOORE, OF BROOKLYN, NEW YORK, ASSIGNOR TO JOSEPH ANNIN, OF SAME PLACE.

JOINT FOR PIPES AND FITTINGS.

SPECIFICATION forming part of Letters Patent No. 255,734, dated March 28, 1882.

Application filed August 20, 1881. (No model.)

*To all whom it may concern:*

Be it known that I, JOHN R. MOORE, a citizen of the United States, residing at Brooklyn, in the county of Kings and State of New York, have invented a new and useful Improvement in Joints for Pipes and Fittings, (for which I have not obtained a patent in any foreign country, neither have others with my consent or knowledge, and the same has not been in public use in the United States for more than two years,) of which the following is a specification.

My invention relates to improvements in joints of wrought-iron and brass pipe and fittings; and the object of my invention is to form a joint more perfect and impervious to gases and fluids at a high pressure than the common and usual joint of pipe and fittings. I attain this object by using, in addition to the threads cut on the pipe and threads tapped into the crosses, T's, L's, couplings, unions, return-bends, and other fittings in the usual manner, a packing gland or ring that encircles the pipe, and that is tapped into the fitting, together with a packing made of india-rubber or of a soft metal, as hereinafter more fully set forth, and shown in the accompanying drawing, with the letters of reference marked thereon.

The drawing is a longitudinal section of a pipe and straight coupling with my improvement attached.

The pipe A is threaded on the end in the usual manner, and the coupling B is also tapped and threaded in the usual manner at both ends, and in addition thereto the orifice at each end is enlarged a short distance from each end toward the center of the fitting, as shown, which enlarged orifice in the fitting is also threaded with a larger tap than the orifice that receives the pipe A.

The ring D is made large enough on the inside diameter to slip over the pipe A, and is threaded on the outside diameter to fit the female thread in the enlarged orifice of the fitting B.

The part P is a ring made of india-rubber or of a soft metal, the outside diameter of which is of the same size as the enlarged orifice of the fitting B, and the inside diameter of which is of the same size as the inside diameter of the ring or packing-gland D.

The part marked C is a thin ring or washer, made of hard metal, the same in diameter as the ring or packing-gland D.

If the fitting is a cross, T, L, return-bend, coupling, or union, the respective joints of either are made in the same manner as hereinbefore described.

The method of connecting the parts and making up the joint is as follows: The ring D is first slipped over the end of the pipe A, then the thin ring or washer of hard metal marked C; third and last, the soft metal or rubber packing marked P. The pipe A is inserted into the fitting B and screwed as far as it will go into the small orifice of the fitting B. The packing P and the washer C are then pushed into the annular space left between the outside of the pipe A and the inside of the threaded orifice of the fitting B. The threaded ring or packing-gland D is then inserted and screwed in between the pipe A and the fitting B by the thread on the ring D and the thread in the fitting B until the ring D presses the packing P between the washer C and the shoulder inside the orifice of the fitting B, that is made by the difference of the diameters of the orifice made for the pipe A and the orifice made for the packing-gland D. The thin hard-metal ring or washer C is placed between the packing P and the packing-gland D to prevent the rotary or circular motion made by the packing-gland D in screwing the same into the fitting B from tearing or cutting the packing P, and the washer C at the same time is pressed against and into the packing P, which causes the same, when pressed against the shoulder inside and at the bottom of the annular space— that is, between the outside of the pipe and the inside of the fitting—to expand and press against the outside of the pipe A and inside of the fitting B.

What I claim as my invention is—

1. The coupling B, of greater internal diameter at its ends, and screw-threaded internally, as shown, in combination with the pipe-sections A, screw-threaded at their ends, the screw-threaded gland D, packings P, and washers C.

2. The combination of the screw-threaded section A with the screw-threaded coupling B, the packing P, the washer C, and the packing-gland D, all substantially as shown and described.

JOHN R. MOORE.

Witnesses:
GEORGE L. BENTON,
JACOB DAVID.